United States Patent
Chu et al.

(10) Patent No.: US 10,757,364 B2
(45) Date of Patent: *Aug. 25, 2020

(54) PAIRING DEVICES IN CONFERENCE USING ULTRASONIC BEACON AND SUBSEQUENT CONTROL THEREOF

(71) Applicant: Polycom, Inc., San Jose, CA (US)

(72) Inventors: Peter L. Chu, Lexington, MA (US); Yibo Liu, Reading, MA (US)

(73) Assignee: Polycom, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/378,557

(22) Filed: Apr. 8, 2019

(65) Prior Publication Data

US 2019/0373217 A1    Dec. 5, 2019

Related U.S. Application Data

(63) Continuation of application No. 16/105,894, filed on Aug. 20, 2018, now Pat. No. 10,462,424, which is a
(Continued)

(51) Int. Cl.
  *H04N 7/14*    (2006.01)
  *H04N 7/15*    (2006.01)
  (Continued)

(52) U.S. Cl.
  CPC ............... *H04N 7/15* (2013.01); *G06F 3/165* (2013.01); *H04M 3/568* (2013.01); *H04N 7/142* (2013.01)

(58) Field of Classification Search
  CPC ...................................................... H04N 7/14
  See application file for complete search history.

(56) References Cited

U.S. PATENT DOCUMENTS 5,263,019 A    11/1993   Chu
5,305,307 A    4/1994    Chu
(Continued)

FOREIGN PATENT DOCUMENTS

EP        1578129 A1    9/2005
JP    2005-260348 A    9/2005
(Continued)

OTHER PUBLICATIONS

Extended European Search report in corresponding EP Appl. 12 189 982.7-1502, dated Feb. 28, 2013.
(Continued)

*Primary Examiner* — Olisa Anwah
(74) *Attorney, Agent, or Firm* — Keith Lutsch, PC

(57) ABSTRACT

A videoconferencing system has a videoconferencing unit that use portable devices as peripherals for the system. The portable devices obtain near-end audio and send the audio to the videoconferencing unit via a wireless connection. In turn, the videoconferencing unit sends the near-end audio from the loudest portable device along with near-end video to the far-end. The portable devices can control the videoconferencing unit and can initially establish the videoconference by connecting with the far-end and then transferring operations to the videoconferencing unit. To deal with acoustic coupling between the unit's loudspeaker and the portable device's microphone, the unit uses an echo canceller that is compensated for differences in the clocks used in the A/D and D/A converters of the loudspeaker and microphone.

24 Claims, 5 Drawing Sheets

Related U.S. Application Data continuation of application No. 15/395,492, filed on Dec. 30, 2016, now Pat. No. 10,097,794, which is a continuation of application No. 14/673,477, filed on Mar. 30, 2015, now Pat. No. 9,544,541, which is a continuation of application No. 13/282,609, filed on Oct. 27, 2011, now Pat. No. 9,024,998.

(51) Int. Cl.
*H04M 3/56* (2006.01)
*G06F 3/16* (2006.01)

(56) References Cited

U.S. PATENT DOCUMENTS

| | | |
|---|---|---|
| 5,390,244 A | 2/1995 | Hinman et al. |
| 6,737,957 B1 | 5/2004 | Petrovic et al. |
| 6,959,260 B2 | 10/2005 | Rodman et al. |
| 7,120,259 B1 | 10/2006 | Ballantyne et al. |
| 7,191,247 B1* | 3/2007 | Philyaw .............. H04W 76/11 709/237 |
| 7,526,078 B2 | 4/2009 | Rodman et al. |
| 7,680,285 B2 | 3/2010 | Ballantyne et al. |
| 7,706,548 B2 | 4/2010 | Kanevsky et al. |
| 7,742,588 B2 | 6/2010 | Rodman et al. |
| 7,787,605 B2 | 8/2010 | Rodman |
| 7,864,938 B2 | 1/2011 | Rodman et al. |
| 7,978,838 B2 | 7/2011 | Rodman et al. |
| 8,320,554 B1 | 11/2012 | Chu |
| 2002/0122055 A1* | 9/2002 | Parupudi ............ G06F 16/9537 715/737 |
| 2002/0152314 A1 | 10/2002 | Hayek et al. |
| 2003/0065918 A1 | 4/2003 | Willey |
| 2004/0004552 A1* | 1/2004 | Yang .................... G08C 19/28 340/12.23 |
| 2004/0059446 A1 | 3/2004 | Goldberg et al. |
| 2004/0145654 A1 | 7/2004 | Motohashi |
| 2004/0264713 A1 | 12/2004 | Grzesek |
| 2005/0094838 A1 | 5/2005 | Tomoda et al. |
| 2006/0192849 A1 | 8/2006 | Inoue |
| 2006/0215585 A1 | 9/2006 | Taniwaki |
| 2007/0047738 A1 | 3/2007 | Ballantyne et al. |
| 2007/0165838 A1 | 7/2007 | Li et al. |
| 2007/0226530 A1 | 9/2007 | Celinski et al. |
| 2007/0273751 A1 | 11/2007 | Sachau |
| 2008/0024593 A1 | 1/2008 | Tsirinsky et al. |
| 2008/0268776 A1 | 10/2008 | Amendola |
| 2009/0111443 A1 | 4/2009 | Gupta |
| 2009/0185695 A1 | 7/2009 | Marton et al. |
| 2009/0233582 A1 | 9/2009 | Suzuki et al. |
| 2010/0081487 A1 | 4/2010 | Chen et al. |
| 2010/0188473 A1 | 7/2010 | King et al. |
| 2011/0069830 A1 | 3/2011 | Chu et al. |
| 2011/0179182 A1 | 7/2011 | Vadla Ravnas |
| 2012/0045994 A1* | 2/2012 | Koh .................... H04W 76/14 455/41.3 |
| 2012/0051187 A1 | 3/2012 | Paulson |
| 2012/0214416 A1* | 8/2012 | Kent .................... H04L 63/18 455/41.2 |
| 2013/0044873 A1 | 2/2013 | Etter |
| 2014/0164629 A1 | 6/2014 | Barth et al. |

FOREIGN PATENT DOCUMENTS

| | | |
|---|---|---|
| JP | 2005-341202 A | 12/2005 |
| JP | 2006-140596 A | 6/2006 |
| JP | 2006-238328 A | 9/2006 |
| JP | 2011-45028 A | 3/2011 |
| JP | 2011-512698 A | 4/2011 |
| WO | 2007076575 A1 | 7/2007 |
| WO | 2008/004879 A2 | 1/2008 |
| WO | 2008004879 A2 | 1/2008 |
| WO | 2009078733 A | 6/2009 |

OTHER PUBLICATIONS

Wilkinson, Ma, S., et al. "A phase modulation-based ultrasonic communication system using Variable Structure Control," Communication Technology (ICCT), 2010 12th IEEE International Conference, pp. 857,860, Nov. 11-14, 2010.

Kindberg, T. et al., "Validating and Securing Spontaneous Associations between Wireless Devices," HP Laboratories Palo Alto, HPL-2002-256, Sep. 12, 2002.

Lopes, C.V., et al., "Aerial acoustic communications," Applications of Signal Processing to Audio and Acoustics, 2001 IEEE Workshop on the , vol., No., pp. 219-222, 2001.

Holm, S., et al., "Indoors data communications using airborne ultrasound," Acoustics, Speech, and Signal Processing, 2005. Proceedings. (ICASSP '05). IEEE International Conference on , vol. 3, No., pp. iii/957,iii/960 vol. 3, Mar. 18-23, 2005.

Ballal, T. et al., "Design and Implementation of an Indoor Ultrasonic Communication System," 22nd IET Irish Signals and Systems Conference (ISSC), Dublin, Ireland, Jun. 23-24, 2011.

Mayrhofer, R., et al., "On the Security of Ultrasound as Out-of-band Channel," Parallel and Distributed Processing Symposium, 2007, IPDPS 2007, IEEE International, Mar. 26-30, 2007.

Extended European Search report in corresponding EP Appl. 12190019.5, dated Oct. 8, 2015.

* cited by examiner

PAIRING DEVICES IN CONFERENCE USING ULTRASONIC BEACON AND SUBSEQUENT CONTROL THEREOF

CROSS-REFERENCE TO RELATED APPLICATIONS

This application is a continuation of U.S. application Ser. No. 16/105,894, filed 20 Aug. 2018, which is a continuation of U.S. application Ser. No. 15/395,492, filed 30 Dec. 2016, which is a continuation of U.S. application Ser. No. 14/673,477, filed 30 Mar. 2015, which is a continuation of U.S. application Ser. No. 13/282,609, filed 27 Oct. 2011, each of which is incorporated herein by reference in their entirety.

BACKGROUND

Videoconferencing units are complex devices, requiring complicated functions to operate. Therefore, videoconferencing vendors create special remote controls and menus to operate the units, but these can be hard to learn and use. This is especially true when the unit has several functional capabilities.

Additionally, good quality microphone pickup in a videoconference requires the participants to be no more than 3-feet from the microphones. Therefore, videoconferencing vendors provide special microphones for placement on tables near the participants in a conference room. The microphones often have wires that can get in the way. As a solution, wireless microphones are available for videoconferencing systems, but they need to be repeatedly recharged if used often, which can be inconvenient.

The subject matter of the present disclosure is directed to overcoming, or at least reducing the effects of, one or more of the problems set forth above.

SUMMARY OF THE DISCLOSURE

In a conferencing system, participants use portable devices as peripherals of a conferencing unit. During the conference, for example, the portable devices communicate audio to the conferencing unit in a wireless connection, while the conferencing unit communicates with a far-end in a conferencing connection. With the system arranged in these connections, each participant can use the microphone on his or her portable device as a personal microphone, which will typically be within 3-ft of the participant. Additionally, the participants can use an application running on their portable devices throughout the conference to control aspects of the conferencing unit.

As noted above, the portable device can be used in a conference, which can simply be an audio conference. Alternatively, the conference can be a videoconference involving video and audio. When video is involved, the portable device can optionally communicate video in addition to or instead of audio. For its part, the unit can be a videoconferencing unit capable of handling both video and audio. Accordingly, the teachings of the present disclosure as properly understood can apply to audio conferencing and videoconferencing. Throughout the disclosure, however, reference is made to videoconferencing, although the disclosed teachings should be understood to apply to just as well to audio conferencing.

To conduct the videoconference, for example, the unit receives near-end audio obtained with microphones of the portable devices via the wireless connections. The unit also receives audio from the unit's microphone(s), which can be table-mounted microphones, a pod, or the like. At the same time, the unit receives near-end video obtained with one or more cameras. Depending on the implementation, the one or more cameras can belong only to the videoconferencing unit, but video from cameras on the portable devices can also be used. The unit then communicates the near-end audio and the near-end video to the far-end via the videoconferencing connection.

As the videoconference is conducted, various participants speak, and the unit switches which near-end audio (and optionally which near-end video) source that it outputs to the far-end. For example, if a participant having a portable device speaks, the unit can output the near-end audio obtained with that device's microphone. When selecting the audio from the portable device, the unit can also output the video obtained with the portable device's camera.

Because several microphones may be sending audio to the unit, the unit preferably selects the near-end audio associated with the microphone having the greatest level, which can be the microphone of a portable device or the unit. Because the audio has the greatest level, it is more likely associated with the current speaker during the conference.

Before the videoconferencing unit communicates with the far-end, a participant can initiate the videoconference by establishing the videoconferencing connection to the far-end using his or her portable device independent of the unit. In this initial arrangement, the portable device can receive far-end video and audio from the far-end for output with a display and loudspeaker on the portable device. Likewise, the portable device can similarly send near-end video and audio obtained with the camera and the microphone of the portable device to the far-end.

Later, the participant at the portable device can then transfer the videoconferencing connection with the far-end from the portable device to the videoconferencing unit. After transfer, the unit can take over receiving far-end video and audio from the far-end, sending the far-end video to the unit's display, and sending the far-end audio to the unit's loudspeaker. Yet, the videoconferencing unit can still use the portable device's microphone for audio capture and the device's camera for video capture at the near-end depending on the circumstances.

Rather than starting the videoconference, the portable device can join an existing videoconference being conducted by the unit. Preferably, the device can automatically pair with the unit by obtaining the unit's IP address encoded in an ultrasonic beacon output by the unit's loudspeaker. Using the decoded IP address, the device establishes a wireless connection as a peripheral with the unit for sending audio and video for the videoconference.

As the unit receives far-end audio from the far-end and outputs it to a loudspeaker, the outputted audio may be acoustically coupled with the microphone of the portable device. To deal with this, an echo canceller of the unit cancels output audio from the loudspeaker that is present in the near-end audio obtained with the portable device's microphone.

Internally, the portable device's microphone uses an analog-to-digital converter that functions with a first clock, while the unit's loudspeaker uses a digital-to-analog converter that functions with a second clock. Thus, these two clocks may operation with different frequencies, which can reduce the effectiveness of the echo canceller. To handle the mismatch in the clocks, a clock compensator of the unit and/or the portable device compensates for a frequency difference between the clocks.

The foregoing summary is not intended to summarize each potential embodiment or every aspect of the present disclosure.

DETAILED DESCRIPTION

A. Videoconferencing System

Figure 1:
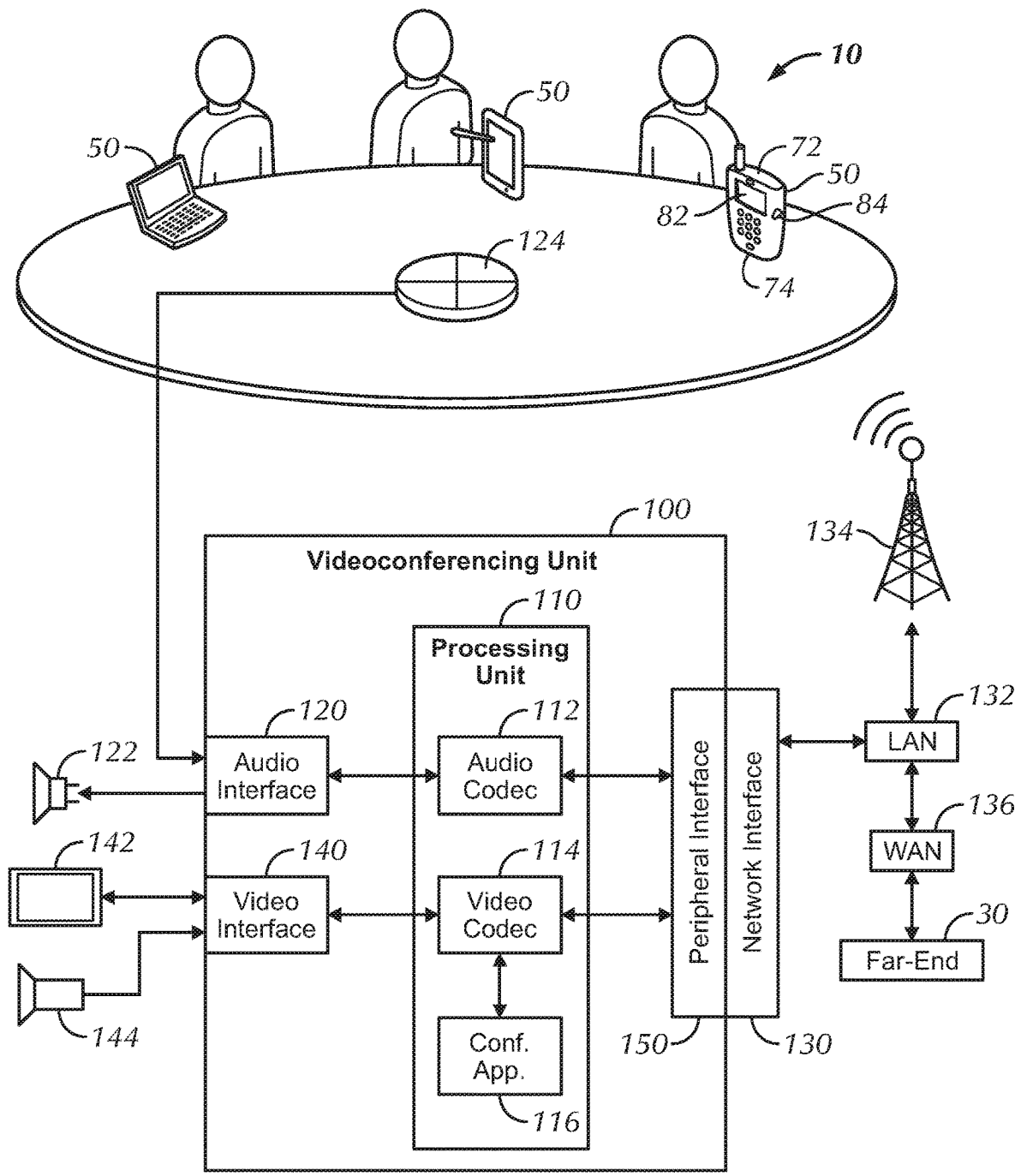
FIG. 1 illustrates a videoconferencing system according to the present disclosure.

A videoconferencing system 10 according to the present disclosure illustrated in FIG. 1 has a videoconferencing unit 100 with a loudspeaker 122 coupled to an audio interface 120. As is typical, the unit 100 can use one or more table-mounted microphones 124, a microphone pod, ceiling microphones, or other acoustic devices coupled to the audio interface 120 for capturing audio, but such acoustic devices may be optional in the present system 10. The system 10 also has a display 142 and a camera 144 coupled to a video interface 142.

Although reference is made herein to the system 10 being used for videoconferencing, the teachings of the present disclosure can apply equally to audio conferencing lacking video. Nevertheless, reference will continue to be made here to videoconferencing for the sake of description.

Internally, the unit 100 has a processing unit 110 with an audio codec 112 and a video codec 114 respectively connected to the audio and video interfaces 120 and 140 for encoding and decoding audio and video for the videoconference. Finally, the unit 100 has a network interface 130 connected to the codecs 112 and 114 for communicating audio and video between the near-end unit 100 and far-end units 30.

During a videoconference, many of the participants would likely have their own portable device 50 available because portable devices 50 have become a common appliance. Users are comfortable using the portable devices 50, and the videoconferencing unit 100 can use the portable devices 50 as videoconferencing peripherals as disclosed herein.

In general, the portable devices 50 can include any of a number of available devices, including, but not limited to, peripheral devices, cellular telephones, smartphones, tablet PCs, touch screen PCs, PDAs, hand-held computers, netbook computers, laptop computers, and the like. Additionally and as discussed later, the portable devices 50 can have processing capabilities and functionality for operating a camera, a display, and a microphone and for connecting to a network, such as Wi-Fi network, Internet, and the like.

In general, the network interface 130 can connect to the far-end units 30 via an Ethernet connection, a wireless connection, an Internet connection, a POTS connection, or any other suitable connection for videoconferencing or combination thereof. As part of the network interface 130 or separate therefrom, the unit 100 includes a peripheral interface 150 that enables the videoconferencing unit 100 to communicate with local peripherals, such as the portable devices 50. In the current example, the network interface 130 connects the unit 100 to a local intranet of a local area network (LAN) 132, which connects in turn to a wide area network (WAN) 136, such as the Internet. The LAN 132 may have a wireless local area network (WLAN), Wireless Fidelity (Wi-Fi) network, personal area network (PAN) (e.g., Bluetooth), or similar type of wireless network 134 for connecting to the portable devices 50. Accordingly, participants can connect their portable devices 50 with the wireless network 134 to the LAN 132 so transport between the portable devices 50 and the videoconferencing unit 100 can use the wireless network 134 and the LAN 132.

In many instances, the portable devices 50 can have high quality microphones 74, and the unit 100 can use the device's microphones 74 as videoconferencing microphones. In this way, several of the participants can use the microphones 74 on their devices 50 as personal videoconference microphones, and the close proximity of each microphone 74 to each participant will likely offer high quality audio pickup for the videoconference. Additionally, the portable devices 50 can have high quality cameras 84, and the unit 100 can use the devices' cameras 84 as personal videoconference cameras in close proximity to the participants.

B. Portable Device

Figure 2:
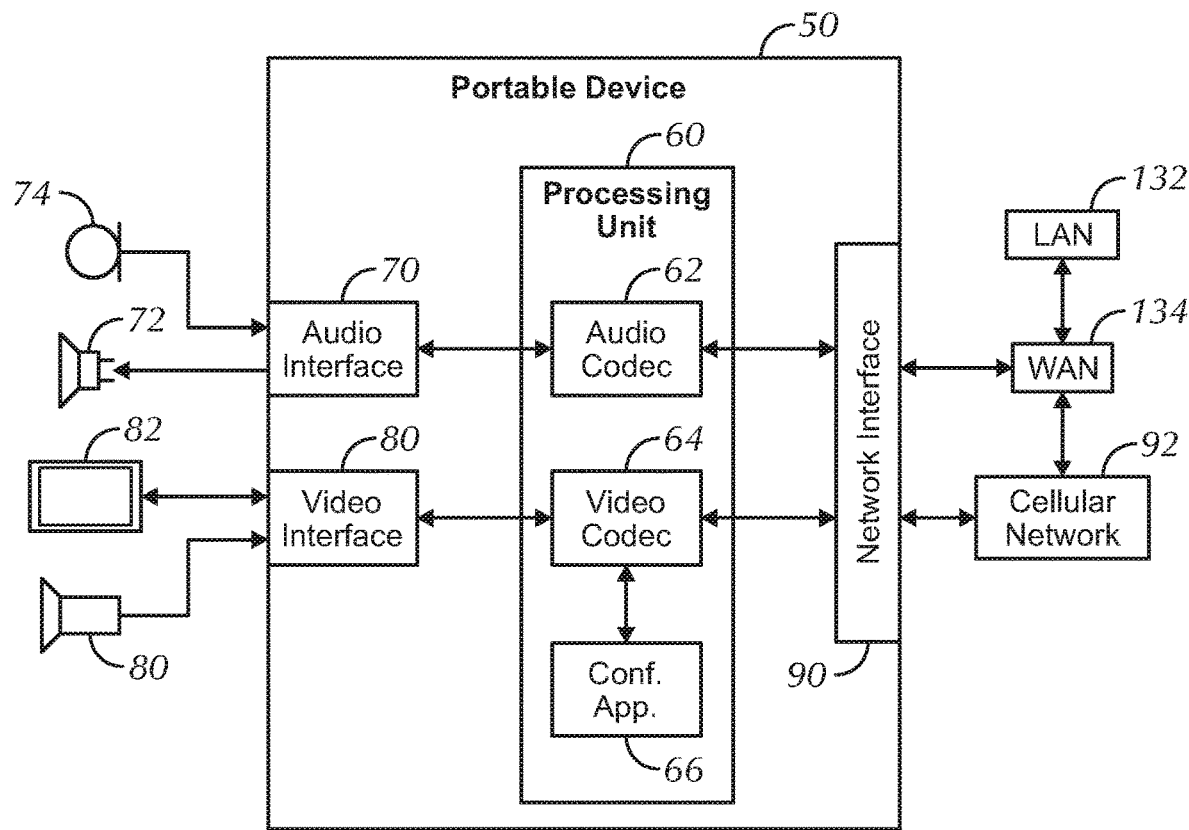
FIG. 2 schematically illustrates a portable device for use with the disclosed system.

Looking at a portable device 50 in more detail, FIG. 2 schematically illustrates an example of a portable device 50 for use with the disclosed system 10. For audio, the device 50 has a loudspeaker 72 and a microphone 74 coupled to an audio interface 70, while the device 50 has a display 82 and a camera 84 coupled to a video interface 80 for video. Internally, the portable device 50 has a processing unit 60 with an audio codec 62 and a video codec 64 respectively connected to the audio and video interfaces 70 and 80 for encoding and decoding the audio and video. Finally, the portable device 50 has a network interface 90 connected to the codecs 70 and 80 for communicating audio and video with the near-end unit (100) and far-end units (30).

In one type of connection, for example, the network interface 90 can connect to a typical cellular network 92 if the device 50 can be used for cellular communications. In another type of connection, the network interface 90 can connect to the LAN 132 via the wireless network 134 so the portable device 50 can communicate with the videoconferencing unit (100) or far-end (30). As one skilled in the art will appreciate, any other type of connection can be used to communicate between the portable device 50 and the videoconferencing unit (100). As will also be appreciated, establishing a connection between the portable device 50 and the videoconferencing unit (100) and far-end (30) requires particular protocols, applications, accounts, and other details that are pre-arranged for the connection to be possible so the details are omitted here.

C. User Interface

Figure 3:
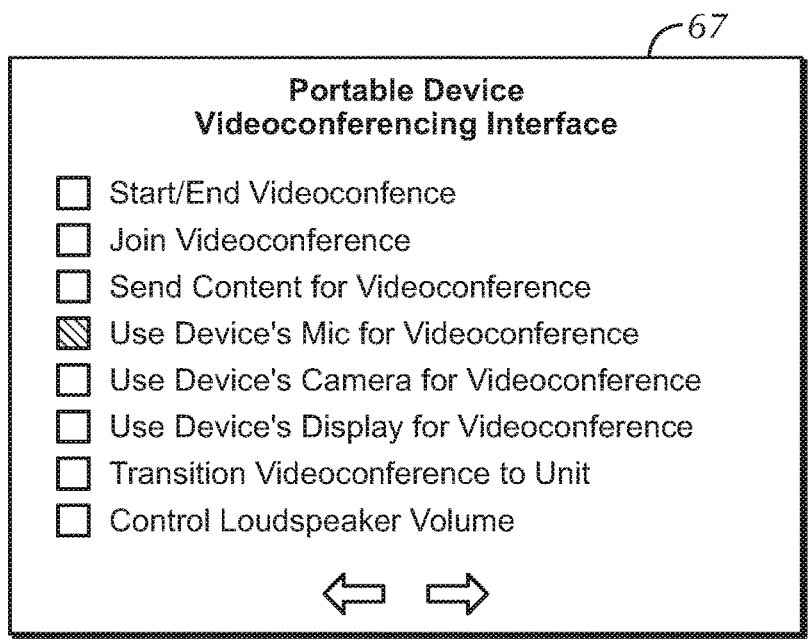
FIG. 3 shows a videoconferencing interface for the portable device.

To operate in conjunction with the videoconferencing unit (100) and optionally controlling the unit's functions, the portable device's processing unit 60 has a videoconferencing application 66 with a user interface. When operated, the application 66 allows a participant to use the portable device 50 as a peripheral to the videoconferencing system (10). FIG. 3 shows an example videoconferencing interface 67 for the portable device's application (66). Participants can use the portable device's interface 67 to operate in the videoconference system (10).

As shown in the example of FIG. 3, the user interface 67 has a number of user interface items available for the application (66). The items can include, but are not limited to, starting a videoconference, ending a videoconference, joining a videoconference, using the device's microphone 74 and/or camera 84 for the videoconference, transferring the videoconference from the portable device 50 to the unit 100, and performing additional functions. Some of these additional functions can be similar to the typical functions available on a conventional remote control of a videoconferencing unit, such as controlling loudspeaker volume, moving cameras, changing display options, etc.

Some general discussion of the user interface items follows. By selecting to start a videoconference, for example, the portable device 50 can be used to initiate a videoconference as discussed herein. By selecting to join a current videoconference, the portable device 50 can become a peripheral device to the videoconferencing unit 100 currently conducting the videoconference. By selecting to use the device's microphone, camera, or display, the user can configure how the portable device 50 is to be used as a peripheral to the videoconferencing unit 100.

Finally, by selecting to send content, the user interface can allow the participant to send content from the portable device 50 to the videoconferencing unit 100 for incorporation into the videoconference. The content can include a video, an image, a document, a presentation, etc. that resides on the portable device 50. Thus, in this arrangement, the portable device 50 can act as a content or presentation device for the unit 100 and can have a video player, an image application, a document application, a presentation application, etc. for generating the content so the device 50 can send the content to the unit 100 through the network connection.

D. Videoconference Process

Figure 4A:
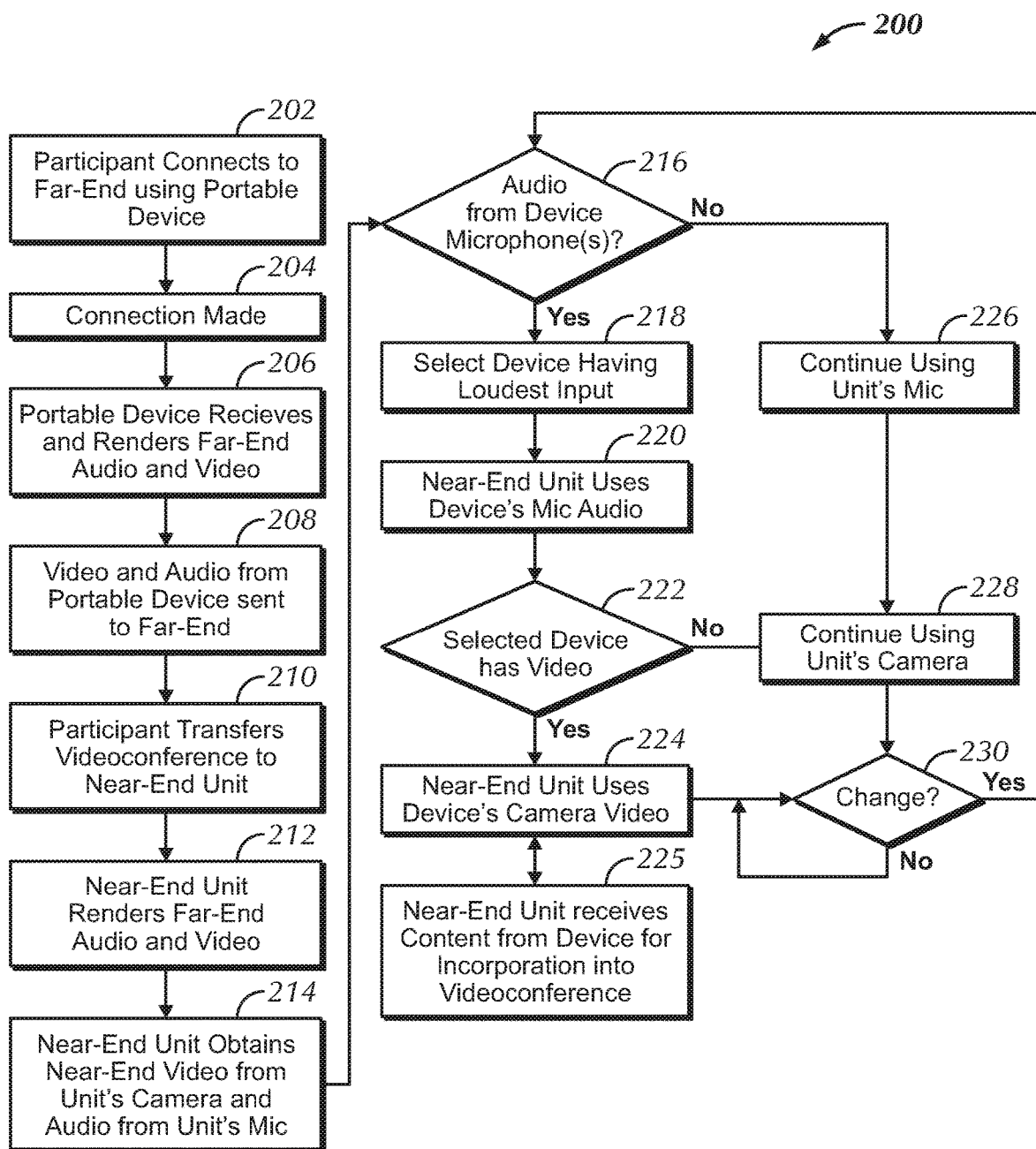
FIG. 4A illustrates a process for conducting a videoconference with the system of FIG. 1 when the portable device initiates the videoconference.

Having an understanding of the videoconferencing system 10, the videoconferencing unit 100, and the portable device 50, discussion now turns to how the portable devices 50 can be used with the videoconferencing unit 100 during a videoconference. As briefly hinted above, a participant can start a videoconference with a portable device 50 and can later transfer it to the videoconferencing unit 100. FIG. 4A illustrates a process 200 for conducting a videoconference with the system 10 of FIG. 1 (to which reference is concurrently made) when the portable device 50 initiates the videoconference.

To initiate the videoconference, a participant connects to the far-end 30 using their portable device 50 and the videoconferencing application 66 (Block 202). Any of the various network connections can be used to establish the videoconference. For example, the portable device 50 can connect via the Wi-Fi network 134 to the LAN 132 and then to the WAN (i.e., Internet) 136. If the portable device 50 has cellular functionality, then the videoconference can be established with a cellular telephone call as known in the art.

Once connected to the far-end 30 (Block 204), the portable device 50 receives and renders the far-end video and audio for output on the portable device 50 using its display 82 and loudspeaker 72 (Block 206). At this point, the portable device's existing camera 84 and microphone 74 can transmit video and audio to the far-end 30 as part of the videoconference (Block 208).

When desired, the participant selects to transfer the videoconference to the near-end videoconferencing unit 100 (Block 210). To transfer the videoconference, for example, the participant initiates the transfer by selecting an interface item on the device's conferencing application (66). The portable device 50 transfers the videoconference connection details to the videoconferencing unit 100, and the videoconferencing unit 100 in response establishes its own videoconference connection with the far-end 30.

For example, the conferencing application 66 on the portable device 50 can have a "transfer" button for the participant to select on the user interface (67). (See FIG. 3.) When the transfer is selected, the user interface (67) can have a number of input screens for the participant to enter the IP address or other identifier of the far-end 30 so the videoconferencing unit 100 can establish the connection. Other details may also be entered in the user interface (67), such as passwords, connection information, participant tags, etc.

Once the transfer is completed and verified, the portable device 50 disables its connection with the far-end 30 so it will only use its local connection to the videoconferencing unit 100 for the videoconference. At this point, the unit 100 begins rendering the far-end video and audio with the higher quality processing available with the unit 100 (Block 212).

Now as the conference proceeds, near-end video processing switches from the portable device's camera 84 to the unit's higher quality camera 144, and the audio processing also switches from the device's microphone 74 to the unit's microphone 124 (Block 214). Yet, as noted herein, the portable device 50 remains paired in communication with the videoconferencing unit 100 via the network connection (e.g., Wi-Fi network and LAN) so the device 50 can be used for video and audio processing when chosen to do so. In other words, the device's microphone 74 can still be used to obtain the videoconference audio, and the device's camera 72 can be used to obtain videoconference video.

At the outset, however, audio and video processing may be handled by the videoconferencing unit 100 as shown in FIG. 4A. When the unit 100 is processing audio, the portable device's loudspeaker 72 can be muted so that it does not output audio during the videoconference, or the portable device 50 may simply not receive audio for output from the unit 100 via the local network connection.

At some point during the videoconference, the participant with the paired device 50 may speak, and the unit 100 and/or the device 50 monitors whether audio from the device's microphone 74 is obtained (Decision 216). In one implementation, the paired device 50 obtains audio with its microphone 74 and transmits this audio in its paired network connection to the videoconferencing unit 100 regardless of whether the participant with the paired device 50 is speaking. In turn, the videoconferencing unit 100 determines whether the microphone 74 is capturing active speaking by the participant. As an alternative, the paired device 50 obtains audio with its microphone 74, but does not send the audio to the unit 100 unless the device 50 determines there is active speaking.

In any event, if there is no device audio (either because none of the devices 50 is using its microphone 74 for audio or because none of the active device microphone 74 is capturing speech) (No-Decision 216), the unit 100 continues using its microphone 124 for audio capture (Block 226). Following on this, the unit 100 may still continue using its camera 122 for video capture as there may be no need to switch to video capture from a portable device 50 when a participant is not speaking (Block 228).

At some point in the videoconference, however, one of the devices 50 using its microphone 74 for audio pickup does obtain audio from its participant, and the unit 100 uses this audio for the videoconference as detailed below (Yes-Decision 216). In using the audio, the videoconferencing unit's audio codec 112 encode the microphone's audio as conference audio and sends the conference audio from the portable device 50 to the far-end 30. If several device microphones 74 (and possibly the unit's microphone 124) are concurrently capturing audio, then the unit 100 selects the microphone 74 or 124 having the loudest input (Block 218) and uses that device's audio for the videoconference audio (Block 220). This comparison may prevent the unit 100 from choosing a source of audio input in error. Any of the numerous techniques can be used for determining the acoustic energies of input audio and comparing them to find the strongest input audio.

If some of the participants do not have a portable device 50, the unit 100 can obtain conference audio from the existing microphone (124) (if available) or from the closest portable device's microphone 74 (presuming it is the loudest). In the end, the unit 100 does not necessarily need to know how many participants are present and how many have a portable device 50 capturing audio, although this could be useful and can be manually or automatically determined. At most, the unit 100 needs merely to select a microphone (whether one of the portable device's microphones 74 or the unit's existing microphone 124) having the loudest captured audio for input.

The device 50 from which audio is used may also have its camera 84 available for capturing video for the videoconference, and the unit 100 decides whether the device's camera 84 can capture video of the speaking participant for the videoconference (Decision 222). If not available (either because there is no camera 84 or it is not enabled), the unit 100 continues using its camera 122 for the conference video (Block 228). Otherwise, the unit 100 uses the video from the device's camera 84 for the videoconference (Block 224).

At any point during the process 200, the participant can elect to send content from the portable device 50 to the videoconferencing unit 100 for incorporation into the videoconference (Block 225). As noted above, the content can include a video, an image, a document, a presentation, etc. that resides on the portable device 50, and the portable device 50 can send the content through the network connection (e.g., wireless network 134 to the LAN 132) to the unit 100. In turn, the unit 100 can incorporate the content into the data sent to the far-end as part of the videoconference.

Depending on the capabilities of the portable device 50 and the type of content involved, the content can be sent as a data stream or in a data file to the unit 100. Additionally, the portable device 50 acting as a content or presentation device may or may not be capable of acting as a peripheral (i.e., capturing and sending audio and/or video from the device 50 to the unit 100), as this would depend on the processing capabilities of the device 50. All the same, the portable device 50 can be configured to send one or more of audio, video, and content to the unit 100 at any given time during the videoconference as configured by the participant.

The current processing arrangement may continue as long as the circumstances remain the same (Decision 230). At some point, the participant with the device 50 delivering audio (and optionally video) may stop speaking, the participant may disable the paired connection of the device 50 with the unit 100, the participant may leave the room with the device 50, or any other type of change may occur. Accordingly, the unit 100 will stop its processing arrangement and will return again to determining whether to use audio and video from a portable device 50 or from the videoconferencing unit 100 (Decision 216).

The scenario above has discussed how the portable device 50 can initiate the videoconference with the far-end 30 and then transfer it to the videoconferencing unit 100. In an alternative scenario, the videoconferencing unit 100 can initiate the videoconference and can begin rendering audio and video obtained with the conventional microphone(s) 124 and the unit's camera 144. Then, during the videoconference, participants with portable devices 50 can connect or pair with the videoconference unit 100 to join the videoconference.

Once the device 50 pairs with the unit 100, the participant can use the user interface application 66 to perform any of various functions, such as display the videoconference video with the portable device's display 82, reproduce the videoconference audio with the loudspeaker 72 or a headphone output, start and stop the videoconference, etc. More specifically, the paired device 50 can be used as a microphone and optional video peripheral during the videoconference as detailed herein.

Figure 4B:
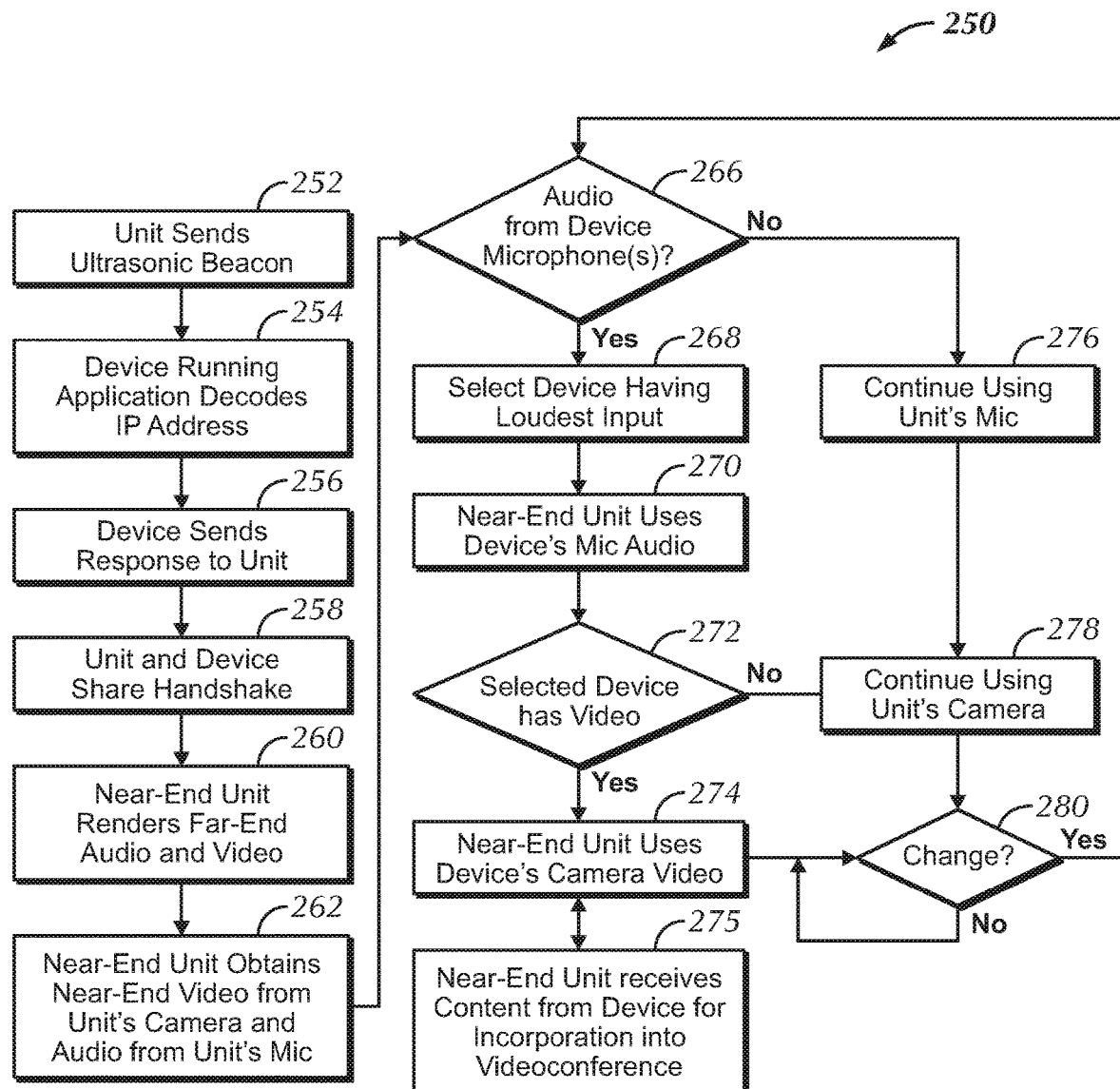
FIG. 4B illustrates a process for conducting a videoconference with the system of FIG. 1 when the portable device joins the videoconference in progress.

To that end, FIG. 4B shows a process 250 for a portable device 50 to join a videoconference as a peripheral to the videoconferencing unit 100 during a videoconference. Initially in the process 250 of FIG. 4B, the videoconferencing unit 100 repeatedly sends an ultrasonic beacon encoding its IP address into the surrounding environment, as the unit 100 conducts the videoconference (Block 252). A participant in the room having a portable device 50 running a conferencing application (66) can select to join the videoconference conducted by the unit 100, and the device's application (66) decodes the IP address from the ultrasonic beacon (Block 254). Using the decoded IP address and wireless network (134) and LAN (132), the device 50 sends a response to the unit 100 to join the videoconference (Block 256), and the device 50 and unit 100 exchange a handshake to initiate the communication between them so the device 50 can be paired with the unit 100 (Block 258).

As the videoconference continues, the near-end unit 100 renders far-end audio and video (Block 260) and obtains near-end video from the unit's camera 144 and audio from the unit's microphone 124 (Block 262). Yet, when appropriate, the portable device's microphone 74 capturing audio can be used for the videoconference, and the device's camera 84 capturing video can also be used for the videoconference.

From here on, processing can continue as in the previous arrangement of FIG. 4A. As long as none of the portable devices 50 capture audio with the greatest level, then the unit 100 can continue using its microphone 124 and camera 144 to send to the far-end 30 (Block 276-278).

At some point, for example, one of the devices 50 using its microphone 74 for audio pickup obtains audio from its participant, and the unit 100 uses this audio for the videoconference as detailed below (Yes-Decision 266). If several device microphones 74 and 124 are obtaining audio, then the unit 100 selects the microphone 74 and 124 having the loudest input (Block 268) and uses that device's audio for the videoconference audio by sending the audio to the far-end 30 (Block 270).

When the portable device 50 used for audio has its camera available for capturing video for the videoconference, the unit 100 decides whether the device's camera 82 can capture video for the videoconference (Decision 272). If not available, the unit 100 continues using its camera 122 (Block 278). Otherwise, the unit 100 accepts the video from the device's camera 82 for the videoconference (Block 274).

Finally, at any point during the process 250, the participant can elect to send content from the portable device 50 to the videoconferencing unit 100 for incorporation into the videoconference in the same manner described previously (Block 275).

The current processing arrangement may continue as long as the circumstances remain the same (Decision 280). At some point, the participant at the device delivering audio (and optionally video) may stop speaking, and the unit 100 will return to determining whether audio and video should be captured with another portable device 50 or with the videoconferencing unit 100 (Decision 266).

The choice on whether to output video from a portable device 50 in the previous processes 200, 250 relied on whether the portable device 50 was being currently used to obtain input audio for the videoconference. In other words, if the portable device 50 is not selected for audio, then the device 50 would not be used for obtaining video in the previous processes 200, 250. Yet, other arrangements could be used so that a portable device 50 obtaining only video and not audio could be used to obtain video for the videoconference without obtaining audio.

E. Automatic Pairing

As noted above, a portable device 50 can automatically connect or pair with the videoconferencing unit 100 using ultrasonic pairing so the portable device 50 and videoconferencing unit 100 can communicate with one another through the network connection. The videoconference unit 100 transmits an ultrasonic beacon encoding its IP address using its loudspeaker 122. This IP address can be the unit's address in the local intranet.

The ultrasonic beacon is preferably beyond of the audible range but low enough so conventional loudspeaker and microphone components can still have a useful signal response. Therefore, the frequency is preferably above 20 kHz. One acceptable frequency is 21 kHz. Since this frequency is above the human range of hearing, it cannot be heard during the videoconference. Additionally, the beacon purposely has a low volume when output.

Transmission of the IP address and any other pertinent information in the beacon preferably uses an audio frequency-shift keying (AFSK) form of frequency modulation with the carrier signal of about 21 kHz. As noted above, the device 50 having a microphone 74 and running the peripheral conferencing application (66) detects the beacon, decodes the IP address based on the AFSK modulation, sends a response to the videoconferencing unit 100 via the network connections, and the two devices 50 and 100 share a handshake so the device 50 can be used in the videoconference.

The pairing can disconnect automatically when the device 50 leaves a room or is actively disconnected by the participant. The device 50 can then connect automatically to another videoconferencing unit when entering another room. Unlike Bluetooth technology, the ultrasound beacon can be limited to the environment (room) of the videoconference's unit 100 so there may be less chance of cross-interference between different videoconferencing units in a building causing incorrect pairing of devices 50 to the units 100. Thus, the ultrasonic pairing can allow the unit 100 to identify specifically that the device 50 is in the same environment as the unit 100 and not located somewhere else in a building.

Although the unit 100 is described as sending an ultrasonic beacon encoding its IP address, each of the devices 50 can do the same. Therefore, in a reverse pairing arrangement, the unit 100 detects an ultrasonic beacon from a portable device 50, decodes the device's IP address, and establishes the network connection with the portable device 50 based on the decoded IP address. Moreover, the portable devices 50 can pair with one another using their IP addresses encoded in ultrasonic beacons.

F. Echo Cancellation

As noted above, the portable device's microphone 74 can capture audio and transmit it through the network interface 90, wireless network 134, and LAN 132 to the videoconferencing unit 100 for sending to the far-end 30. At the same time during the videoconference, the videoconferencing unit's loudspeaker 122 outputs audio at the near-end for the videoconference environment. Because the portable device's microphone 74 and the unit's loudspeaker 122 are in the same environment, acoustic coupling can occur when the portable device's microphone 74 directly captures audio output by the loudspeaker 122. As is known, this acoustic coupling can cause an "echo" to be transmitted by the unit 100 to the far-end 30, and the far-end 30 will hear its own audio returned back to it at a delay. Therefore, the videoconferencing system 10 preferably attempts to reduce the detrimental effects of any acoustic coupling that may develop during the videoconference.

Figure 5:
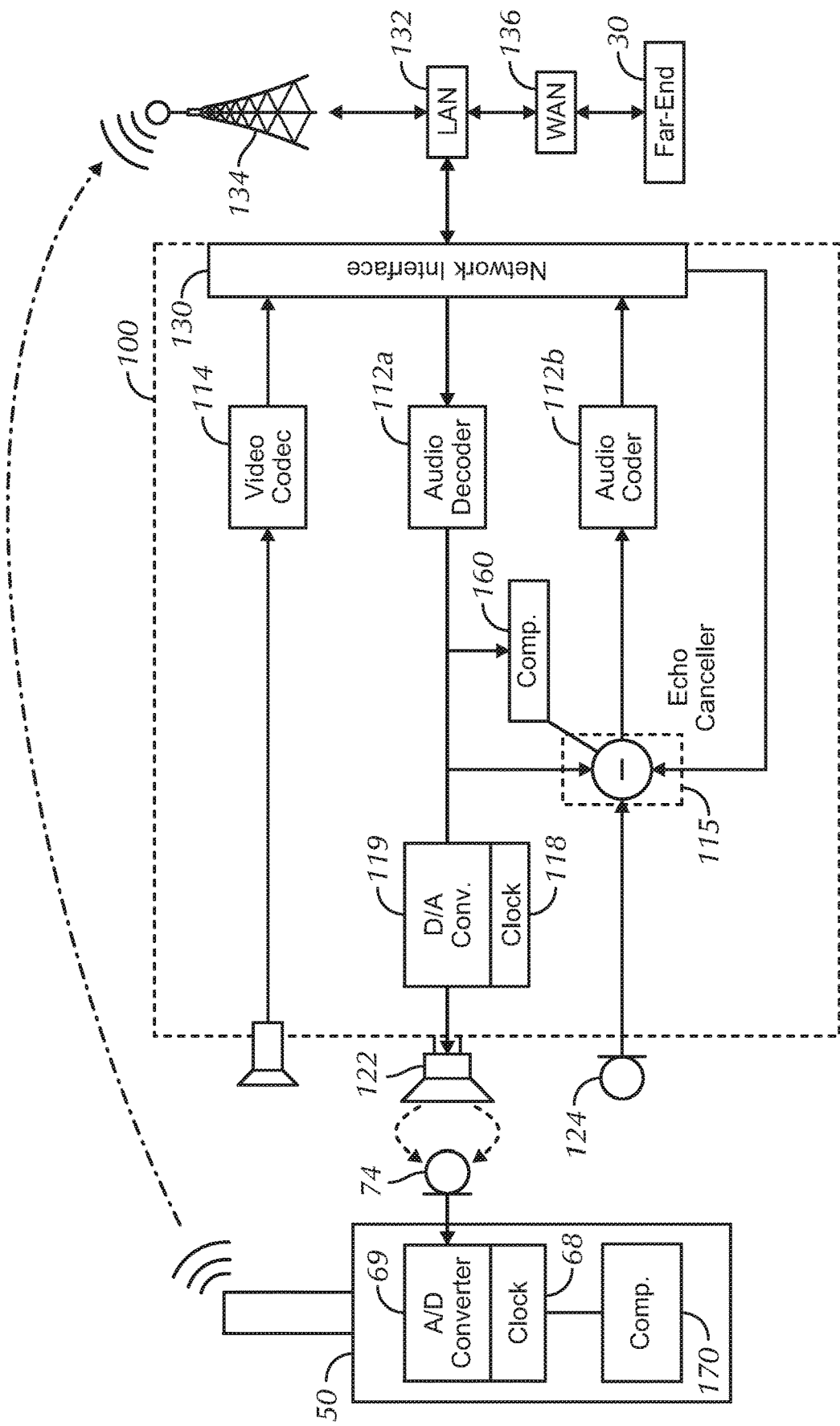
FIG. 5 schematically illustrates an echo-canceller for the videoconferencing unit and clocks for the videoconferencing unit and portable device of the system.

To that end, discussion turns to FIG. 5. As schematically shown and previously discussed, the videoconferencing unit 100 receives output audio from the far-end 30 via the network interface 130, and the audio codec's decoder 112a decodes the output audio for output by the unit's loudspeaker 122. To output the audio, a digital-to-analog converter 119 uses a sample rate conversion based on a clock 118 and converts the digital output to analog output, which the loudspeaker 122 then outputs to the environment.

In turn, the portable device's microphone 74 captures audio in the environment. In capturing the audio, the portable device's analog-to-digital converter 69 uses a sample rate conversion based on a clock 68 and converts the analog input to digital input. Some of the audio captured with the microphone 74 may be acoustically coupled from the loudspeaker 122. Nevertheless, the portable device 50 communicates the captured audio to the videoconferencing unit 100 via the network connection (e.g., Wi-Fi network, LAN, and the like). In turn, the unit's audio coder 112b encodes the input audio for sending to the far-end 30. If the audio were left alone, any acoustically coupled audio from the loudspeaker 122 to the microphone 74 would be sent via the network interface 130 to the far-end 30 as an "echo."

To deal with acoustic coupling and the resulting echo, the videoconferencing unit 100 has an echo canceller 115. Using any of the known echo cancellation techniques, the echo canceller 115 compares the input audio from the microphone 74 with the output audio for the loudspeaker 122 and attempts to remove the output audio from the loudspeaker 122, which has been included in the input audio picked up via acoustic coupling between the loudspeaker 122 and the microphone 74. When functioning properly, the echo canceller 115 can reduce the chances that the far-end 30 will detect an "echo."

In most instances, the analog-to-digital (A/D) clock 68 for the portable device's microphone 74 is not matched in frequency to the digital-to-analog (D/A) clock 118 of unit's loudspeaker 122. The mismatched clocks 68 and 118 can result in poor performance of the acoustic echo cancellation. For proper cancellation, for example, the loudspeaker's D/A clock 118 and the microphone's A/D clock 74 need to be at the same frequency within a small variation (e.g., less than 1 parts per million (PPM)). Being on separate devices, however, the loudspeaker's and microphone's clocks 68 and 118 are controlled by physically separate crystals, and their frequencies may be off by 100 PPM or more.

G. Clock Compensation

To deal with the mismatched clocks 68 and 118, the system 10 uses a clock compensator 160 at the unit 100 and/or a clock compensator 170 at the portable device 50 so the echo canceller 115 on the unit 100 can more effectively remove echo caused by acoustic coupling between the unit's loudspeaker 122 and the device's microphone 74. To do this, the clock compensator 160, 170 compensates for the clock differences and improves the performance of the unit's echo canceller 115.

In one embodiment, the clock compensator 160 on the videoconferencing unit 100 assists in the echo cancellation. In particular, the clock compensator 160 cross-correlates an echo estimate of the far-end audio (being output by the unit's loudspeaker 122) and the near-end audio (being input from the device's microphone 74). Using the cross-correlated results, the compensator 160 then adjusts a sample rate conversion factor used for the echo cancellation analysis of the audio to be sent to the far-end 30. In this arrangement, the clock compensator 160 using the echo estimate can compensate for the differences in the clocks 68 and 118 without involving the portable device 50.

In another embodiment, the clock compensator 170 on the portable device 50 assists in the echo cancellation by determining a difference in the clocks 68 and 118. The difference is then used to "synchronize" the audio clocks 68 and 118 by adjusting the sample conversion rate of the portable device's microphone 74 or by adjusting the sample rate conversion for the unit's echo canceller 115 or the unit's loudspeaker 122.

As noted above, the portable device 50 pairs with the unit 100 by obtaining the unit's IP address in an ultrasonic beacon emitted by the unit's loudspeaker 122. This ultrasonic beacon is preferably transmitted with a carrier signal with an ultrasonic frequency of 21 kHz, for example. After capturing the beacon, the portable device 50 uses the frequency of the ultrasonic carrier signal to determine the frequency difference between the clock 68 for its microphone 74 and the clock 118 for the unit's loudspeaker 122.

For example, the unit 100 emits the ultrasonic beacon as noted above at a pre-determined frequency at 21,000 Hz using the loudspeaker 122. The microphone 74 on the portable device 50 captures the ultrasonic beacon, and the compensator 170 measures the beacon's frequency relative to the unit's A/D clock 68. In general, the measured frequency will differ from the beacon's pre-determined frequency (21 kHz) due to the different frequencies of the separate clocks 68 and 118. By way of example, the microphone's clock 68 may be about 1 percent slower than the loudspeaker's clock 118. In this case, the compensator 170 will measure the frequency of the beacon as 21,210 Hz (i.e., 21,000×1.01).

Despite this measured difference, the portable device 50 with the microphone 74 and conferencing application (66) knows that the actual frequency of the beacon should be the predetermined 21,000 Hz. Therefore, the compensator 170 can deduce that the clock frequency difference is 210 Hz (i.e., 21,210 Hz−21,000 Hz). Once the frequency difference is known to within an acceptable deviation (e.g., 1 PPM), the portable device 50 can use re-sampling algorithms and can adjust the microphone's sample rate conversion to match the loudspeaker's sample rate conversion. In this way, the A/D converter 69 based on the device's clock 68 can having its sample conversion rate match that of the D/A converter 119 based on the unit's clock 118. Once the rates match, the echo canceller 115 on the unit 100 can operate more effectively.

The reverse is also possible where loudspeaker's sample rate conversion is adjusted. For example, the portable device 50 can send the determined frequency difference to the unit 100 via the network connection. In turn, the compensator 160 of the unit 100 can use re-sampling algorithms and can change the loudspeaker's sample rate conversion used for outputting audio so it will match the microphone's sample rate conversion. Alternatively, the compensator 160 can use this determined difference in the sample rate conversion of the echo cancellation so the echo canceller 115 can operate more effectively.

In a further alternative, the portable device 50 may not actually calculate the frequency difference. Instead, the portable device communicates its audio capture frequency of its microphone 74 responding to the ultrasonic beacon to the videoconferencing unit 100 using the network connection. Then, the videoconferencing unit 100 can calculate the frequency difference between the predetermined carrier signal frequency and the audio capture frequency communicated to it from the portable device 50. Thus, the procedures discussed above would apply to the unit's processing instead of the device's processing.

In the current example, only the audio between one portable device 50 and the unit 100 has been discussed. In general, however, there can be any number of devices 50 in the room, and each can have its own A/D converter 69 and clock 68 for its microphone 74. These devices 50 can send their digital audio streams to the videoconference unit 110 via the wireless connection, and some of these streams may contain output audio from the loudspeaker 122 that has been acoustically coupled to the devices' microphone 74. The teachings above can be applied to the audio of each of the portable devices.

The foregoing description of preferred and other embodiments is not intended to limit or restrict the scope or applicability of the inventive concepts conceived of by the Applicants. It will be appreciated with the benefit of the present disclosure that features described above in accordance with any embodiment of aspect of the disclosed subject matter can be utilized, either alone or in combination, with any other described feature, in any other embodiment or aspect of the disclosed subject matter.

In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. A method to communicate over a network in a network system, the method comprising:
   outputting, in an imperceptible acoustic beacon in a near-end environment with a first device, connection information for connecting to a given device in the network, wherein the connection information comprises a network address of the given device encoded in the acoustic beacon;
   connecting a second device in the near-end environment to the given device of the network system by receiving a response in the network system from the second device, the response being based on the second device using the output connection information and requesting connection of the second device to the given device;

obtaining, at the network system via the network, content from the second device; and using the obtained content in the network system.

2. The method of claim 1, wherein the given device is the first device.

3. The method of claim 1, wherein outputting the connection information with the first device comprises: encoding the connection information in an ultrasonic audio signal of the acoustic beacon; and outputting the ultrasonic audio signal with a loudspeaker of the first device.

4. The method of claim 1, wherein connecting the second device to the given device comprises connecting the second device to the given device with a near-end connection of the network, wherein the near-end connection comprises a Local Area Network (LAN) connection, an intranet connection, a Wireless Local Area Network (WLAN) connection, a Personal Area Network (PAN) connection, a Wireless Fidelity (Wi-Fi) connection, a wireless connection, or a combination thereof.

5. The method of claim 1, wherein obtaining the content from the second device comprises obtaining the content comprising a control at the given device from the second device; and wherein using the obtained content in the network system comprises operating a function of the given device according to the obtained control.

6. The method of claim 1, wherein obtaining the content from the second device comprises obtaining the content comprising audio, video, an image, a document, and/or a presentation at the given device from the first device; and wherein using the obtained content in the network system comprises outputting the obtained content with the given device.

7. The method of claim 1, wherein obtaining the content from the second device comprises obtaining the content comprising input at the give device from the second device; and wherein using the obtained content in the network system comprises sending the input from the given device to a far-end via a far-end connection.

8. A system to communicate over a network, the system comprising:
   a loudspeaker for outputting audio in a near-end environment;
   one or more interfaces for communicatively connecting in the network; and
   at least one first device communicatively connected to the loudspeaker and the one or more interfaces, the at least one first device being configured to output connection information in an imperceptible acoustic beacon in the near-end environment with the loudspeaker, the connection information comprising a network address of a given device encoded in the acoustic beacon;
   wherein the system is configured to:
      receive a response from a second device in the near-end environment to connect with the given device in the network, the response being based on the second device using the output connection information and requesting connection of the second device with the given device; and
      obtain, via the network, content from the second device; and
      use the obtained content in the system.

9. The system of claim 8, wherein the given device is the at least one first device.

10. The system of claim 8, wherein to obtain the content from the second device, the system is configured to obtain the content comprising a control at the given device from the second device; and wherein to use the obtained content in the system, the system is configured to operate a function of the given device according to the obtained control.

11. The system of claim 8, wherein to obtain the content from the second device, the system is configured to obtain the content comprising audio, video, an image, a document, and/or a presentation at the given device from the first device; and wherein to use the obtained content in the system, the system is configured to output the obtained content with the given device.

12. The system of claim 8, wherein to obtain the content form the second device, the system is configured to obtain the content comprising input at the give device from the second device; and wherein to use the obtained content in the system, the system is configured to send the input from the given device to the far-end via the far-end connection.

13. A method to communicate over a network in a network system, the method comprising:
   detecting, with a first device in a near-end environment, an imperceptible acoustic beacon output by a second device in the near-end environment;
   decoding, with the first device, connection information from the detected acoustic beacon, the connection information comprising a network address of a given device encoded in the acoustic beacon;
   connecting the first device with the given device via the network by using the decoded connection information; and
   transmitting content from the first device to the given device for use in the network system.

14. The method of claim 13, wherein the given device is the second device.

15. The method of claim 13, wherein transmitting the content comprises transmitting the content comprising a control to operate a function of the given device.

16. The method of claim 13, wherein transmitting the content comprises transmitting the content comprising audio, video, an image, a document, and/or a presentation for output with the given device.

17. The method of claim 13, wherein transmitting the content comprises transmitting the content comprising input for sending from the given device to a far-end via a far-end connection.

18. A programmable storage device having program instructions stored thereon for causing a programmable control device to perform a method to communicate over a network in a network system, the method comprising:
   detecting, with a first device in a near-end environment, an imperceptible acoustic beacon output by a second device in the near-end environment;
   decoding, with the first device, connection information from the detected acoustic beacon, the connection information comprising a network address of a given device encoded in the acoustic beacon;
   connecting the first device with the given device via the network by using the decoded connection information; and
   transmitting content from the first device to the given device for use in the network system.

19. The programmable storage device of claim 18, wherein the given device is the second device.

20. A first device to communicate over a network in a network system, the first device comprising:
   a microphone detecting an imperceptible acoustic beacon output by a second device in a near-end environment;
   one or more interfaces for communicatively connecting in the network; and a processing unit communicatively connected to the microphone and the one or more interfaces, the processing unit being configured to:
    decode connection information from the detected acoustic beacon, the connection information comprising a network address of a given device encoded in the acoustic beacon;
    connect the first device with the given device via the network by using the decoded connection information; and
    transmit content from the first device to the given device for use in the network system.

21. The first device of claim 20, wherein the given device is the second device.

22. The first device of claim 20, wherein to transmit the content, the processing unit is configured to transmit the content comprising a control to operate a function of the given device.

23. The first device of claim 20, wherein to transmit the content, the processing unit is configured to transmit the content comprising audio, video, an image, a document, and/or a presentation at the given device for output with the given device.

24. The first device of claim 20, wherein to transmit the content, the processing unit is configured to transmit the content comprising input for sending from the given device to a far-end via a far-end connection.

* * * * *